United States Patent
S Bykampadi

(10) Patent No.: US 12,206,774 B2
(45) Date of Patent: Jan. 21, 2025

(54) METHOD AND APPARATUS FOR NETWORK FUNCTION MESSAGING

(71) Applicant: Nokia Technologies Oy, Espoo (FI)

(72) Inventor: Nagendra S Bykampadi, Bangalore (IN)

(73) Assignee: Nokia Technologies Oy, Espoo (FI)

(*) Notice: Subject to any disclaimer, the term of this patent is extended or adjusted under 35 U.S.C. 154(b) by 49 days.

(21) Appl. No.: 17/274,551

(22) PCT Filed: Sep. 9, 2019

(86) PCT No.: PCT/FI2019/050641
§ 371 (c)(1),
(2) Date: Mar. 9, 2021

(87) PCT Pub. No.: WO2020/053480
PCT Pub. Date: Mar. 19, 2020

(65) Prior Publication Data
US 2022/0052844 A1   Feb. 17, 2022

(30) Foreign Application Priority Data

Sep. 10, 2018 (IN) .............................. 201811034023

(51) Int. Cl.
*H04L 9/08* (2006.01)
*H04L 9/40* (2022.01)

(52) U.S. Cl.
CPC .......... *H04L 9/0866* (2013.01); *H04L 9/0838* (2013.01); *H04L 9/085* (2013.01); *H04L 63/0281* (2013.01); *H04L 63/166* (2013.01)

(58) Field of Classification Search
None
See application file for complete search history.

(56) References Cited

U.S. PATENT DOCUMENTS

2017/0093824 A1   3/2017   Shulman et al.
2017/0289104 A1   10/2017  Shankar et al.
(Continued)

FOREIGN PATENT DOCUMENTS

WO   2017/004391 A1   1/2017

OTHER PUBLICATIONS

ETSI, 5G; Security architecture and procedures for 5G System, Jul. 2019, V15.5.0, Entire Document (Specifically 127-151) (Year: 2019).*

(Continued)

*Primary Examiner* — Saleh Najjar
*Assistant Examiner* — Shadi H Kobrosli
(74) *Attorney, Agent, or Firm* — Harrington & Smith

(57) ABSTRACT

SEPP 1 forms a first TLS protected N32-c connection between with SEPP 2 so that SEPP 1 and SEPP 2 are respectively a TLS client and server. A TLS protected second N32-c connection between with SEPP 2 so that SEPP 1 and SEPP 2 are respectively a TLS server and client. On forming the first and second TLS protected N32-c connections, respective first and second shared secrets are formed. First and second master keys are obtained from the first and second shared secrets, respectively. N32-f context IDs are created by each SEPP on setup of the first and second N32-c connections. Based on the first master key and the first N32-f context ID, a first session key is produced for encryption of a first N32-f request to the second security edge proxy and correspondingly a second session key is produced for decryption of a second N32-f request from SEPP 2.

12 Claims, 4 Drawing Sheets

(56) References Cited

U.S. PATENT DOCUMENTS

| | | | |
|---|---|---|---|
| 2018/0115517 A1 | 4/2018 | Rotvold et al. | |
| 2020/0053126 A1* | 2/2020 | Nair | H04W 12/08 |
| 2020/0329044 A1* | 10/2020 | Aono | H04W 12/10 |
| 2020/0344604 A1* | 10/2020 | He | H04W 12/088 |
| 2021/0014284 A1* | 1/2021 | Lehtovirta | H04L 63/164 |
| 2021/0014680 A1* | 1/2021 | Saarinen | H04L 63/0281 |
| 2021/0044569 A1* | 2/2021 | Xu | H04L 67/564 |
| 2021/0235268 A1* | 7/2021 | Wu | H04W 12/03 |
| 2021/0258869 A1* | 8/2021 | Di Girolamo | H04W 48/16 |
| 2021/0282078 A1* | 9/2021 | Martinez De La Cruz | H04W 8/28 |

OTHER PUBLICATIONS

ETSI; 5G; Security Architecture and Procedures for 5G Systems, Jul. 2019, V15.5.0; Entire Document (Specifically 127-151) (Year: 2019).*

3GPP TS 33.501 Version 15.1.0 Release 15, Jul. 2018, All Pages (Year: 2018).*

3GPP TSG-SA WG3 Meeting #92, Change Request 0376, Nokia, Ericsson, NTT Docomo, NCSC, KPN, Deutsche Telekom AG, China Mobile (Aug. 20-24, 2018) (Year: 2018).*

Rescorla, E; The Transport Layer Security (TLS) Protocol Version 1.3; Aug. 2018, Internet Engineering Task Force (IETF), pp. 97-98 (Year: 2018).*

"3rd Generation Partnership Project; Technical Specification Group Services and System Aspects;Security architecture and procedures for 5G system(Release 15)", 3GPP TS 33.501, V15.1.0, Jun. 2018, pp. 1-152.

"Application Layer Security on the N32 Interface", 3GPP TSG-SA WG3 Meeting #92, S3-182700, Nokia, Aug. 20-24, 2018, 22 pages.

"LS on N32 Error Signalling", 3GPP TSG-SA WG3 Meeting #92, S3-182562, SA3, Aug. 20-24, 2018, 1 page.

International Search Report and Written Opinion received for corresponding Patent Cooperation Treaty Application No. PCT/FI2019/050641, dated Dec. 3, 2019, 14 pages.

Extended European Search Report received for corresponding European Patent Application No. 19860862.2, dated Mar. 28, 2022, 8 pages.

Dierks et al., "The Transport Layer Security (TLS) Protocol Version 1.2", Network Working Group, RFC 5246, Aug. 2008, pp. 1-104.

* cited by examiner

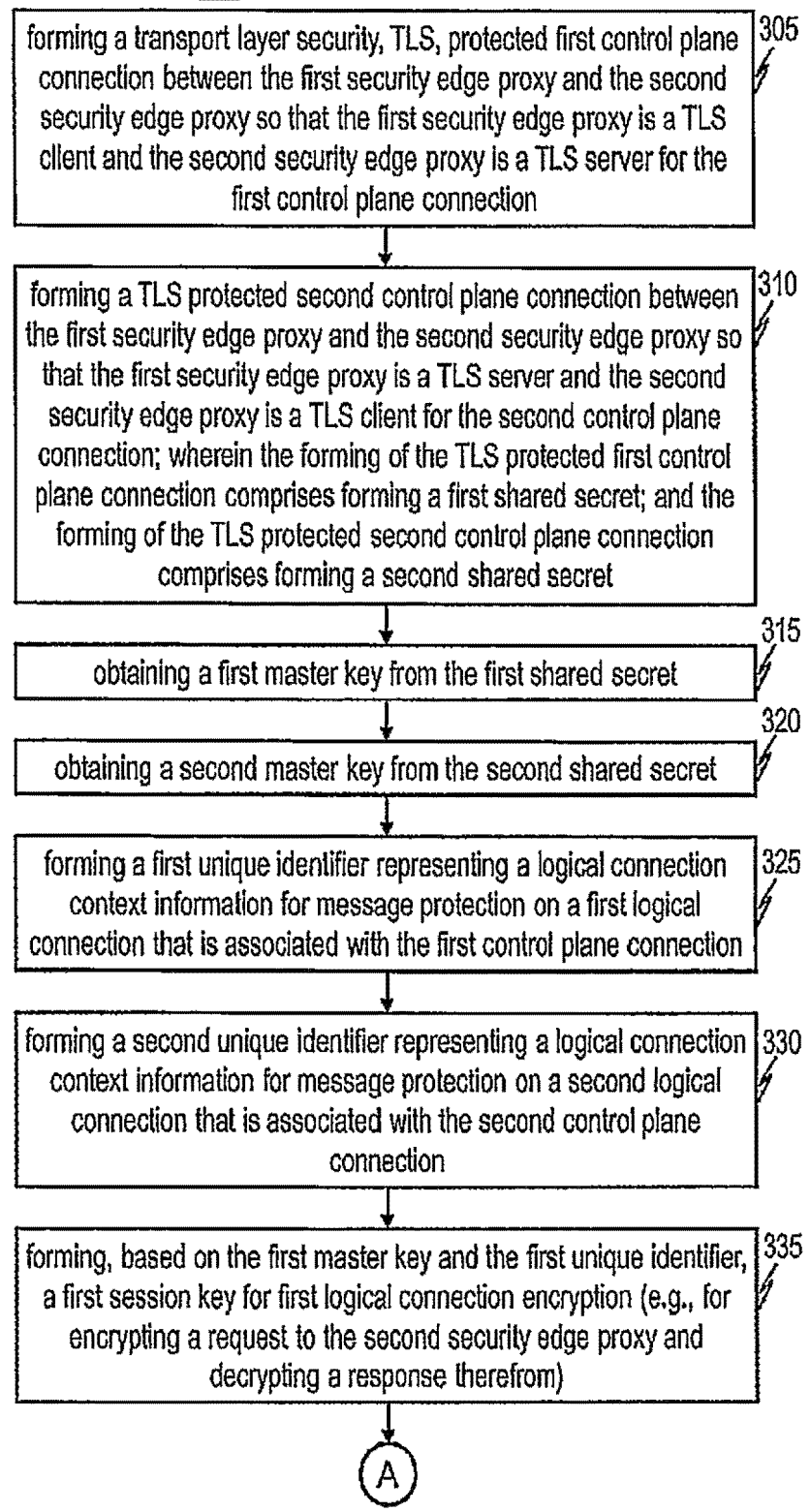

(A)↓  FIG. 3 continued

| |
|---|
| forming a first initialization vector randomizer (such as salt) for encryption of a first logical connection request to the second security edge proxy |
| forming, based on the second master key and the second unique identifier, a second session key for a second logical connection encryption (e.g., for decrypting a request from the second security edge proxy and encrypting a response thereto) |
| forming the first master key using a TLS exporter function associated with the first control connection |
| forming the second master key using a TLS exporter function associated with the second control connection |
| protecting the first logical connection by application layer security, e.g., JWE |
| protecting the second logical connection by application layer security, e.g., JWE |
| employing different application layer security cipher suites for the first and second logical connections |

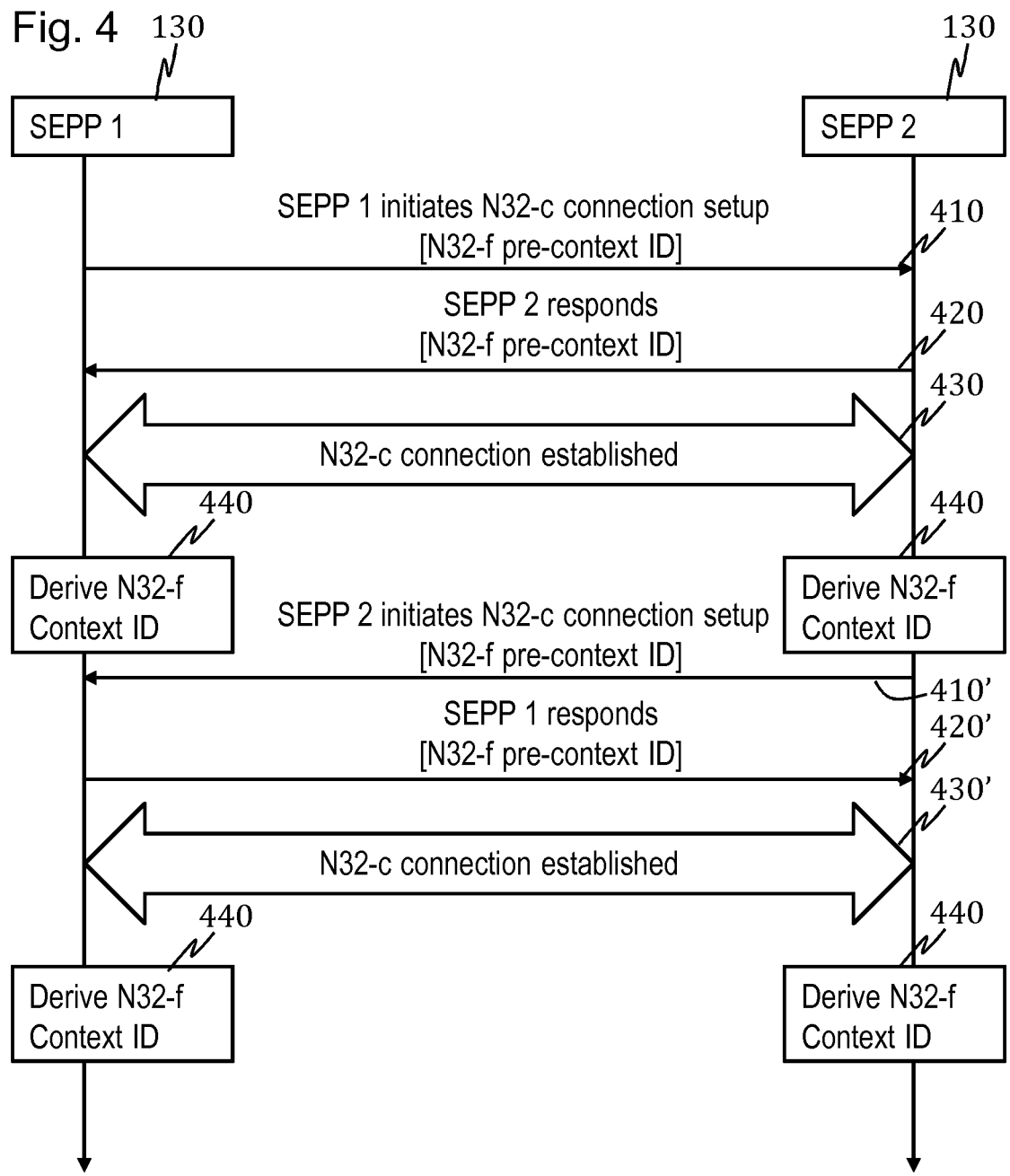

METHOD AND APPARATUS FOR NETWORK FUNCTION MESSAGING

RELATED APPLICATION

This application claims priority to PCT Application No. PCT/FI2019/050641, filed on Sep. 9, 2019, which claims priority to IN Application No. 201811034023, filed on Sep. 10, 2018, each of which is incorporated herein by reference in its entirety.

TECHNICAL FIELD

Various example embodiments relate to network function messaging.

BACKGROUND

This section illustrates useful background information without admission of any technique described herein representative of the state of the art.

In 5G, a service based architecture is introduced to model services as network functions (NFs) that communicate with each other using RESTful APIs. In the scenario where the two communicating NFs are in two different public land mobile networks (PLMNs), communication happens over a roaming interface between the two participating PLMNs.

To protect NF specific content in the messages that are sent over the roaming interface, each 5G PLMN has a Security Edge Proxy (SEPP) as the entity sitting at the perimeter of the PLMN network and acting as a gateway that protects all the traffic going out of the network. The SEPP implements application layer security for data exchanged between two inter-network NFs over an N32 roaming interface at the service layer. To this end, two types of connections need to be created between the communicating SEPPs:

a) An N32-c connection for control plane messages—this is an end-to-end (e2e) Transport Layer Security (TLS) based connection, with one SEPP being the client and the other SEPP acting as the server.

b) An N32-f connection for protected Restful API request/response messages—this is a logical e2e connection between two SEPPs and is used to send and receive HTTP messages carrying the protected Restful API request/response messages as payload.

The formed N32-c connection enables control plane request/response type messaging only from the client to the server side of the TLS connection. However, there is an HTTP(S) push-method for signaling events from the server to the client, but that does not enable receiving a simple response from the peer SEPP.

SUMMARY

Various aspects of examples of are set out in the claims.

According to a first example aspect there is provided a first security edge proxy serving a first network function, comprising:
a communication circuitry;
a data storage; and
a processing circuitry configured to cause, using the communication circuitry and the memory, any one or more of:
forming a transport layer security, TLS, protected first control plane connection between the first security edge proxy and the second security edge proxy so that the first security edge proxy is a TLS client and the second security edge proxy is a TLS server for the first control plane connection;
forming a TLS protected second control plane connection between the first security edge proxy and the second security edge proxy so that the first security edge proxy is a TLS server and the second security edge proxy is a TLS client server for the second control plane connection.

The forming of the TLS protected first control plane connection may comprise forming a first shared secret.

The forming of the TLS protected second control plane connection may comprise forming a second shared secret.

The first and/or second shared secret may be an exporter master_secret that is computed automatically by TLS protocol at both the client and server ends during TLS handshake.

The first control plane connection may be an N32-c connection.

The second control plane connection may be an N32-c connection.

The processing circuitry may be further configured to initiate, using the communication circuitry and the memory, request-response messaging using the first control plane connection.

The processing circuitry may be further configured to obtain a first master key from the first shared secret.

The processing circuitry may be further configured to obtain a second master key from the second shared secret.

The processing circuitry may be further configured form a first unique identifier representing a logical connection context information for message protection on a first logical connection that is associated with the first control plane connection.

The processing circuitry may be further configured to form a second unique identifier representing a logical connection context information for message protection on a second logical connection that is associated with the second control plane connection.

The processing circuitry may be further configured to form, based on the first master key and the first unique identifier, a first session key for first logical connection encryption. The processing circuitry may be further configured to form, a first initialization vector randomizer (such as salt) for encryption of the first logical connection.

The processing circuitry may be further configured to form, based on the second master key and the second unique identifier, a second session key for second logical connection encryption.

The first logical connection may be an N32-f connection.
The second logical connection may be an N32-f connection.

The first master key may be formed using a TLS exporter function associated with the first control connection.

The second master key may be formed using a TLS exporter function associated with the second control connection.

The first logical connection may be protected by application layer security. The second logical connection may be protected by application layer security. The application layer security may employ JSON Web Encryption, JWE.

The application layer security may employ different cipher suites for the first and second logical connections. Alternatively, the application layer security may employ same cipher suite for the first and second logical connections.

The processing circuitry may be further configured to cause encrypting, using the first shared secret, first control data for transmission over the first control plane connection.

The processing circuitry may be further configured to cause decrypting, using the second shared secret, second control data received over the second control plane connection.

The data storage may comprise at least one memory.

The processing circuitry may comprise at least one processor.

The first network function may be an Access and Mobility Function, AMF.

The first network function may be an Authentication Server Function, AUSF.

The second network function may be an Access and Mobility Function, AMF.

The second network function may be an Authentication Server Function, AUSF.

According to a second example aspect, there is provided a system comprising the first security edge proxy of the first example aspect and the second security edge proxy.

According to a third example aspect, there is provided a method in a security edge proxy, comprising:
forming a transport layer security, TLS, protected first control plane connection between the first security edge proxy and the second security edge proxy so that the first security edge proxy is a TLS client and the second security edge proxy is a TLS server for the first control plane connection; and
forming a TLS protected second control plane connection between the first security edge proxy and the second security edge proxy so that the first security edge proxy is a TLS server and the second security edge proxy is a TLS client for the second control plane connection; wherein
the forming of the TLS protected first control plane connection comprises forming a first shared secret; and
the forming of the TLS protected second control plane connection comprises forming a second shared secret; the method further comprising:
obtaining a first master key from the first shared secret;
obtaining a second master key from the second shared secret;
forming a first unique identifier representing a logical connection context information for message protection on a first logical connection that is associated with the first control plane connection;
forming a second unique identifier representing a logical connection context information for message protection on a second logical connection that is associated with the second control plane connection;
forming, based on the first master key and the first unique identifier, a first session key for first logical connection encryption; and
forming, based on the second master key and the second unique identifier, a second session key for second logical connection encryption.

According to a third example aspect, there is provided a computer program comprising computer executable program code configured to execute a method of the second example aspect.

The computer program may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in implementations. Some embodiments may be presented only with reference to certain example aspects. It should be appreciated that corresponding embodiments may apply to other example aspects as well.

BRIEF DESCRIPTION OF THE DRAWINGS

For a more complete understanding of example embodiments, reference is now made to the following descriptions taken in connection with the accompanying drawings in which:

FIG. 3 shows a flow chart of a process in a first security edge proxy, according to an example embodiment;

FIG. 4 shows a signaling chart of an example embodiment; and

DETAILED DESCRIPTION OF THE DRAWINGS

An example embodiment and its potential advantages are understood by referring to FIGS. 1 through 5 of the drawings. In this document, like reference signs denote like parts or steps.

Figure 1:
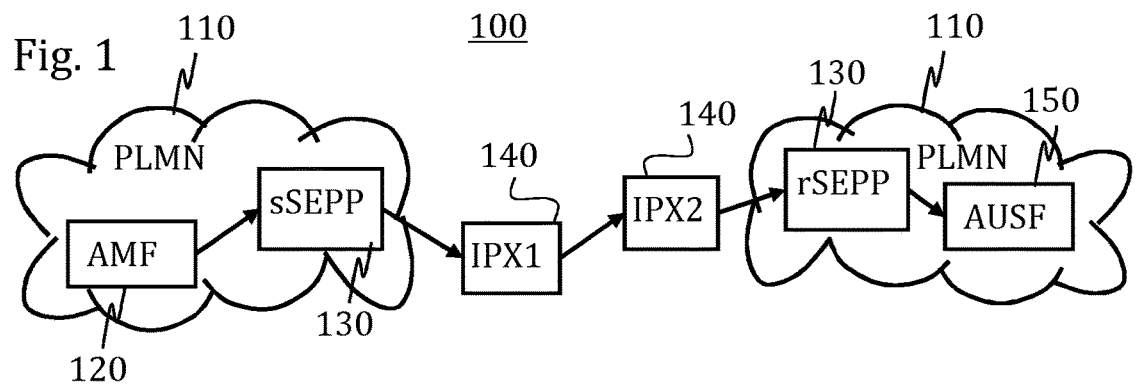
FIG. 1 shows an architectural drawing of a system of an example embodiment.

FIG. 1 shows an architectural drawing of a system 100 of an example embodiment. FIG. 1 shows two PLMNs 110 equipped with a first Network Function 120 that in a sending case is, for example, an Access and Mobility Function (AMF). The PLMNs each further comprise a Security Edge Proxy (SEPP) 130. The SEPP of one PLMN acts as a sending SEPP 130 or sSEPP and another one as a receiving SEPP 130 or rSEPP for one message. The SEPP 130 is a network node at the boundary of an operator's network that receives a message such as an HTTP request or HTTP response from the network function AMF 120, applies protection for sending, and forwards the reformatted message through a chain of intermediate nodes such as IP eXchanges (IPX) 140 towards the rSEPP 130.

The rSEPP 130 receives a message sent by the sSEPP and forwards the message towards a second network function within its operator's network, e.g. an Authentication Server Function (AUSF) 150. The message can alternatively be sent towards any other network function of the second network. In some cases, two SEPPs 130 also communicate with each other, e.g., regarding their mutual connections.

The intermediate node 140 or intermediary in short is, for example, a network node outside the operator's network.

Notice that the rSEPP 130 and sSEPP 130 may simultaneously act in both roles and that their structure may also be similar or identical, so both are denoted by same reference sign 130 while their role in delivery of a particular message is identified by use of the prefix "s" or "r" indicating whether they send or receive.

Figure 2:
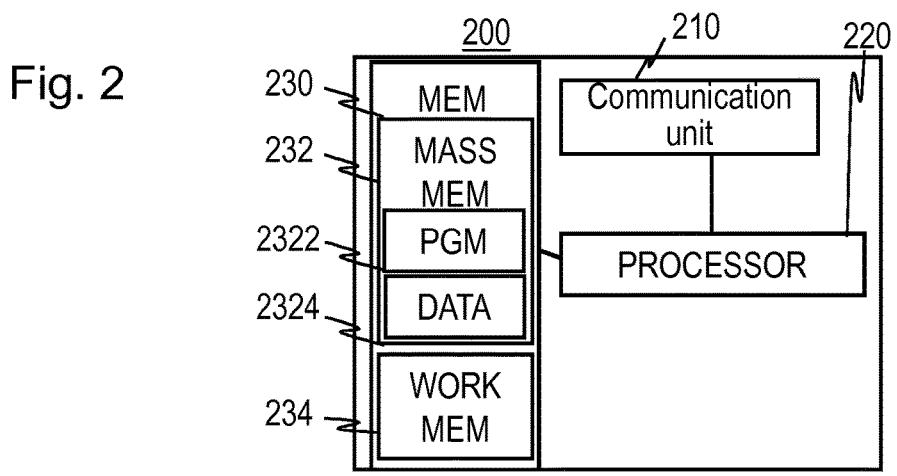
FIG. 2 shows a block diagram of an apparatus according to an embodiment.

FIG. 2 shows a block diagram of an apparatus 200 according to an embodiment. The apparatus may be used as a first network function 120, a SEPP 130, an intermediate node 140, or a second network function 150.

The apparatus 200 comprises a data storage 230 such as a memory. The data storage may comprise a persistent memory 232 that comprises computer program code 2322 and data 2324, and a work memory 234. The apparatus 200 further comprises a processing circuitry 220 including, for example, at least one processor for controlling the operation of the apparatus 200 using the computer program code 2322, a communication circuitry 210 for communicating with other entities. The communication circuitry 210 comprises, for example, a local area network (LAN) port; a wireless local area network (WLAN) circuitry; Bluetooth circuitry; cellular data communication circuitry; or satellite data communication circuitry. The processing circuitry 220 comprises, for example, any one or more of: a master control unit (MCU); a microprocessor; a digital signal processor (DSP); an application specific integrated circuit (ASIC); a field programmable gate array; and a microcontroller.

FIG. 3 shows a flow chart of process 300 of an example embodiment in a first Security Edge Proxy, comprising:
305. forming a transport layer security, TLS, protected first control plane connection between the first security edge proxy and the second security edge proxy so that the first security edge proxy is a TLS client and the second security edge proxy is a TLS server for the first control plane connection; and
310. forming a TLS protected second control plane connection between the first security edge proxy and the second security edge proxy so that the first security edge proxy is a TLS server and the second security edge proxy is a TLS client for the second control plane connection; wherein
the forming of the TLS protected first control plane connection comprises forming a first shared secret, such as TLS 1.3 exporter_master_secret; and
the forming of the TLS protected second control plane connection comprises forming a second shared secret, such as TLS 1.3 exporter_master_secret; the method further comprising:
315. obtaining a first master key from the first shared secret;
320. obtaining a second master key from the second shared secret;
325. forming a first unique identifier (e.g., N32-f context ID) representing a logical connection context information for message protection on a first logical connection that is associated with the first control plane connection;
330. forming a second unique identifier (e.g., N32-f context ID) representing a logical connection context information for message protection on a second logical connection that is associated with the second control plane connection;
335. forming, based on the first master key and the first unique identifier, a first session key for first logical connection encryption (e.g., for encrypting a request to the second security edge proxy 130 and for decrypting a first logical connection response from the second security edge proxy 130);
340. forming a first initialization vector randomizer (such as salt) for the encryption of the first logical connection; and
345. forming, based on the second master key and the second unique identifier, a second session key for second logical connection encryption (e.g., for decrypting a request from the second security edge proxy 130 and for encrypting a second logical connection response to the second security edge proxy 130).

In an example embodiment, both the first and the second security edge proxies 130 form their own N32-f pre-context IDs which are then exchanged between the two SEPPs 130 and combined to form a unique N32-f context ID.

In an example embodiment, the first logical connection is an N32-f connection.

In an example embodiment, the second logical connection is an N32-f connection.

In an example embodiment, the process 300 of FIG. 3 further comprises forming 350 the first master key using a TLS exporter function associated with the first control connection.

In an example embodiment, the process 300 of FIG. 3 further comprises forming 355 the second master key using a TLS exporter function associated with the second control connection.

In an example embodiment, the process 300 of FIG. 3 further comprises protecting 360 the first logical connection by application layer security using the first and second session keys obtained in steps 335 and 345. In an example embodiment, the process 300 of FIG. 3 further comprises protecting 365 the second logical connection protected by application layer security. The application layer security may employ JSON Web Encryption, JWE.

In an example embodiment, the process 300 of FIG. 3 further comprises employing 370 different application layer security cipher suites for the first and second logical connections. Alternatively, the application layer security may employ same cipher suite for the first and second logical connections.

The first network function may be an Access and Mobility Function, AMF. The first network function may be an Authentication Server Function, AUSF. The second network function may be an Access and Mobility Function, AMF. The second network function may be an Authentication Server Function, AUSF.

FIG. 4 shows a signaling chart of an example embodiment. In FIG. 4, the first Security Edge Proxy 130 initiates a first control plane connection (e.g., N32-c) connection setup. The first Security Edge Proxy 130 performs this initiation using a N32-f pre-context ID. In an example embodiment, the N32-f pre-context ID is an identifier value with which the Security Edge Proxy 130 identifies a set of security related configuration parameters, when it receives a protected message from the second Security Edge Proxy 130 that is in a different PLMN.

The second Security Edge Proxy 130 responds 420 using the same N32-f pre-context ID and the first control plane connection is established 430 between the first and second Security Edge Proxies 130. For this connection, the first Security Edge Proxy 130 is a TLS client and the second Security Edge Proxy 130 is a TLS server so that the first Security Edge Proxy 130 can send requests to the second Security Edge Proxy 130 on the first control plane connection and get respective responses from the second Security Edge Proxy 130, but not vice versa. After the first control plane connection is established 430, both first and second Security Edge Proxies 130 derive 440 N32-f context IDs for subsequent N32-f connections.

A second control plane connection is established as the first control plane connection, but in the reverse order, i.e. the second Security Edge Proxy 130 initiates 410' a second control plane connection, the first Security Edge Proxy 130 responds 420' and the second control plane connection is established 430' and the N32-f context IDs are derived 440', as in steps 410 to 440 but with opposite actors and a different pre-context ID and resulting different N32-f context ID.

In an example embodiment, the second N32-c connection need not send the Parameter Exchange message for setting up cipher suites or exchange of modification policies or other configuration parameters as all these have been taken care of by the first N32-c connection setup. The second control plane connection may set up cipher suites and/or exchange modification policies or other configuration parameters based on the first control plane connection setup.

In an example embodiment, on each N32-c connection, the two Security Edge Proxies 130 exchange different N32-f pre-context IDs which may be combined to derive two N32-f context IDs, one per N32-c connection. Two contexts may be created in each Security Edge Proxy 130, one per each N32-c connection.

In an example embodiment, two Security Edge Proxies 130 are expected to agree on a common cipher suite for both the TLS connections. In this case, the two N32-f context IDs refer to the same security context. However, if required the Security Edge Proxies 130 may setup two N32-c connections with a unique cipher suite for each connection. The context IDs then point to different security contexts.

FIG. 4 shows two N32-c connections wherein each Security Edge Proxy 130 initiates establishment of one N32-c connection. The two Security Edge Proxies 130 exchange pre-context IDs and derive N32-f Context ID.

In an example embodiment, for each N32-c connection, the Security Edge Proxies 130 generate an N32-f Master key using TLS exporter function associated with each N32-c connection. Two N32-f Master keys result, each bound to a specific TLS connection associated with the N32-c connection. The Master Key is now used to generate a set of session keys, e.g., as described in the following.

In an example embodiment, the master key is obtained from the TLS exporter using three arguments that are: Label, Context, Length (in octets) of desired output. For the N32-f Master key derivation, the label may be "EXPORTER_3GPP_N32_MASTER", the Context may be " " (the empty string) and the Length may be 64.

In an example embodiment, a pair of session keys and initialization vector (IV) randomizers or salts is derived for each Security Edge Proxy 130 to use when it sets up a N32-f connection to send protected API messages across the N32 interface.

NOTE: In a pair of session keys and IV salts, one session key/IV salt may be used by the client SEPP to send a Request, while the second session key/IV salt is used by the server SEPP for the response. Terms "Client" and "Server" are used in the context of the N32-c connection.

In an example embodiment, each pair of session keys and IV salts are derived using one N32-f Master key and the corresponding N32-f Context ID associated with the N32-c connection.

In an example embodiment, following labels for the security keys are used: "request_key" and "response_key".

In an example embodiment, to generate the IV salts, the labels are: "request_iv_salt" and "response_iv_salt".

Figure 5:
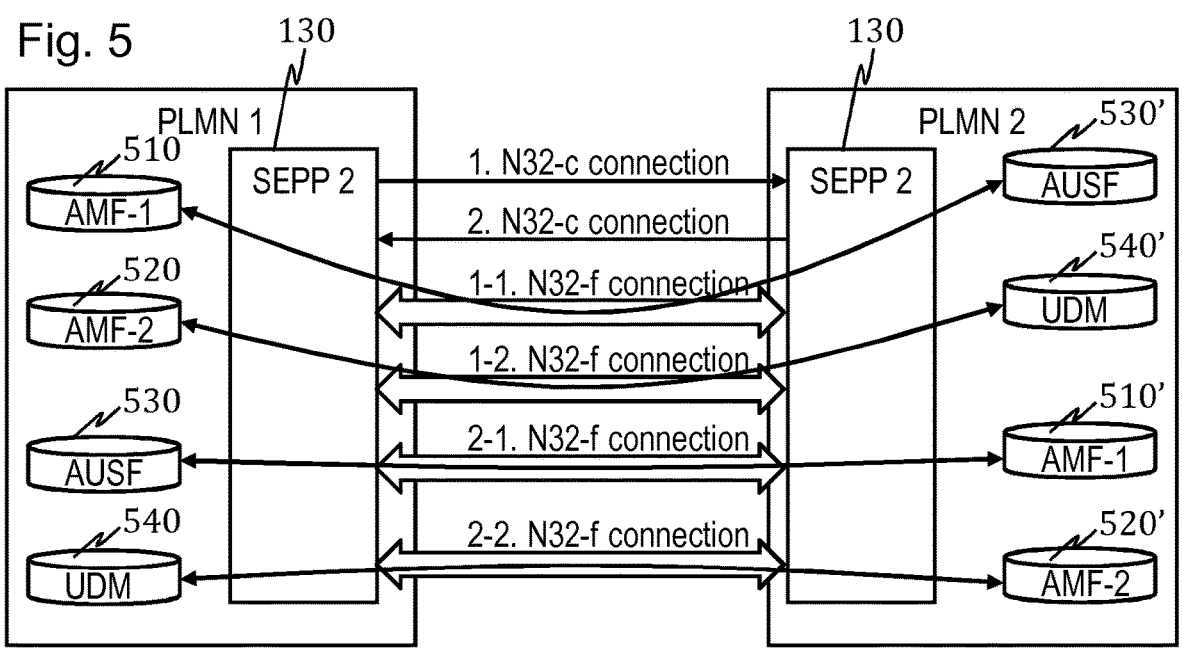
FIG. 5 shows a connection chart of an example embodiment.

FIG. 5 shows a connection chart of an example embodiment. In FIG. 5, there are four N32-f connections established between two Security Edge Proxies 130:
- 1-1 and 1-2 are N32-f connections for two messages initiated by the first Security Edge Proxy 130 for messages sent by Network Functions within PLMN-1. These messages are protected by one pair of keys/salts associated with N32-c connection initiated by the first Security Edge Proxy 130.
- 2-1 and 2-2 are N32-f connections for two messages initiated by the second Security Edge Proxy 130 for messages sent by Network functions within PLMN-2. These messages are protected by one pair of keys/salts associated with N32-c connection initiated by the second Security Edge Proxy 130.

FIG. 5 also shows network elements AMF-1 510 and AMF-2 520 of a first PLMN, AUSF 530 and UDM 540 in the first PLMN as well as corresponding network elements in the second PLMN.

In an example embodiment, SEPP 1 forms a first TLS protected N32-c connection between with SEPP 2 so that SEPP 1 and SEPP 2 are respectively a TLS client and server. A TLS protected second N32-c connection between with SEPP 2 so that SEPP 1 and SEPP 2 are respectively a TLS server and client. On forming the first and second TLS protected N32-c connections, respective first and second shared secrets are formed. First and second master keys are obtained from the first and second shared secrets, respectively. N32-f context IDs are created by each SEPP on setup of the first and second N32-c connections. Based on the first master key and the first N32-f context ID, a first session key is produced for encryption of a first N32-f request to the second security edge proxy and correspondingly a second session key is produced for decryption of a second N32-f request from SEPP 2.

As used in this application, the term "circuitry" may refer to one or more or all of the following:
- (a) hardware-only circuit implementations (such as implementations in only analogue and/or digital circuitry) and;
- (b) combinations of hardware circuits and software, such as (as applicable):
  - (i) a combination of analogue and/or digital hardware circuit(s) with software/firmware; and
  - (ii) any portions of hardware processor(s) with software (including digital signal processor(s)), software, and memory(ies) that work together to cause an apparatus, such as a mobile phone or server, to perform various functions); and
- (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Without in any way limiting the scope, interpretation, or application of the claims appearing below, a technical effect of one or more of the example embodiments disclosed herein is that inter-network network function messaging can be bi-directionally protected. Another technical effect of one or more of the example embodiments disclosed herein is that each SEPP may send HTTP based control plane messages independently over the N32 interface. Yet another technical effect of one or more of the example embodiments disclosed herein is that keys used for protection on N32-f connection are closely tied or associated with each N32-c connection. This may provide a clean cryptographic separation between different logical channels.

Embodiments may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined. Moreover, where reference is made to one component or entity, its functions may be distributed to or more sub-units, e.g. instead of one processor, a plurality of processors may perform some, though not necessarily all, operations of one entity.

Although various aspects are set out in the independent claims, other aspects comprise other combinations of features from the described embodiments and/or the dependent claims with the features of the independent claims, and not solely the combinations explicitly set out in the claims.

It is also noted herein that while the foregoing describes example embodiments, these descriptions should not be viewed in a limiting sense. Rather, there are several variations and modifications which may be made without departing from the scope as defined in the appended claims.

The invention claimed is:

1. An apparatus, comprising:
at least one processor; and
at least one non-transitory memory storing instructions, that when executed by the at least one processor, cause the apparatus at least to:
form a transport layer security protected first control plane connection between a first security edge proxy and a second security edge proxy so that the first security edge proxy is a transport layer security client and the second security edge proxy is a transport layer security server for the first control plane connection; and
form a transport layer security protected second control plane connection between the first security edge proxy and the second security edge proxy so that the first security edge proxy is a transport layer security server and the second security edge proxy is a transport layer security client for the second control plane connection;
form a first unique identifier representing a logical connection context information for message protection on a first logical connection that is associated with the first control plane connection; and
form a second unique identifier representing a logical connection context information for message protection on a second logical connection that is associated with the second control plane connection,
derive an N32-f context identification for each of the first control plane connection and the second control plane connection,
wherein the context identification for each of the first control plane connection and the second control plane connection identifies a different security context;
derive a pair of session keys and an initialization vector randomizer for each first of the first security edge proxy and the second security edge proxy to use to set up the first logical connection and the second logical connection to send protected API messages across an N32 interface,
wherein the pair of session keys and the initialization vector are derived using one N32-f Master key and the N32-f context identification derived for each of the first control plane connection and the second control plane connection;
wherein the first control plane connection is an N32-c connection;
wherein the second control plane connection is an N32-c connection;
wherein the first logical connection is an N32-f connection;
wherein the second logical connection is an N32-f connection;
wherein the first logical connection is protected by application layer security;
wherein the second logical connection is protected by application layer security; and
wherein the first and second logical connections are for inter-network data exchange between a first network function of a first network and a second network function of a second network.

2. The apparatus of claim 1, wherein the first network function is an access and mobility function.

3. The apparatus of claim 1, wherein the first network function is an authentication server function.

4. The apparatus of claim 1, wherein: the-application layer security employs same cipher suites for the first and second logical connections.

5. The apparatus of claim 1, wherein the application layer security employs JSON Web Encryption, JWE.

6. The apparatus of claim 1, wherein the at least one non-transitory memory is storing instructions executed by the at least one processor, to cause the apparatus to:
exchange a different pre-context identification on each of the first control plane connection and the second control plane connection, and
combine the different pre-context identifications to derive the context identification for each of the first control plane connection and the second control plane connection.

7. A method, comprising:
performing by a security edge proxy:
forming a transport layer security, protected first control plane connection between a first security edge proxy and a second security edge proxy so that the first security edge proxy is a transport layer security client and the second security edge proxy is a transport layer security server for the first control plane connection;
and forming a transport layer security protected second control plane connection between the first security edge proxy and the second security edge proxy so that the first security edge proxy is a transport layer security server and the second security edge proxy is a transport layer security client server for the second control plane connection;

forming a first unique identifier representing a logical connection context information for message protection on a first logical connection that is associated with the first control plane connection; and forming a second unique identifier representing a logical connection context information for message protection on a second logical connection that is associated with the second control plane connection, derive a context identification for each of the first control plane connection and the second control plane connection, wherein the context identification for each of the first control plane connection and the second control plane connection identifies a different security context, derive a pair of session keys and an initialization vector randomizer for each first of the first security edge proxy and the second security edge proxy to use to set up the first logical connection and the second logical connection to send protected API messages across an N32 interface, wherein the pair of session keys and the initialization vector are derived using one N32-f Master key and the N32-f context identification derived for each of the first control plane connection and the second control plane connection;

wherein the first control plane connection is an N32-c connection;

wherein the second control plane connection is an N32-c connection;

wherein the first logical connection is an N32-f connection;

wherein the second logical connection is an N32-f connection;

protecting the first logical connection by application layer security; and protecting the second logical connection by application layer security.

8. The method of claim 7, wherein the application layer security employs JSON Web Encryption, JWE.

9. The method of claim 7, wherein the first network function is an access and mobility function.

10. The method of claim 7, wherein the first network function is an authentication server function.

11. The method of claim 8, further comprising: encrypting, using a first shared secret, first control data for transmission over the first control plane connection; and decrypting, using a second shared secret, second control data received over the second control plane connection.

12. A non-transitory computer program product comprising computer executable program code embodied on a non-transitory memory configured to perform:

forming a transport layer security, protected first control plane connection between a first security edge proxy and the second security edge proxy so that the first security edge proxy is a transport layer security client and the second security edge proxy is a transport layer security server for the first control plane connection;

and forming a transport layer security protected second control plane connection between the first security edge proxy and the second security edge proxy so that the first security edge proxy is a transport layer security server and the second security edge proxy is a transport layer security client server for the second control plane connection;

forming a first unique identifier representing a logical connection context information for message protection on a first logical connection that is associated with the first control plane connection; and forming a second unique identifier representing a logical connection context information for message protection on a second logical connection that is associated with the second control plane connection, derive a context identification for each of the first control plane connection and the second control plane connection, wherein the context identification for each of the first control plane connection and the second control plane connection identifies a different security context, derive a pair of session keys and an initialization vector randomizer for each first of the first security edge proxy and the second security edge proxy to use to set up the first logical connection and the second logical connection to send protected API messages across an N32 interface, wherein the pair of session keys and the initialization vector are derived using one N32-f Master key and the N32-f context identification derived for each of the first control plane connection and the second control plane connection;

wherein the first control plane connection is an N32-c connection;

wherein the second control plane connection is an N32-c connection;

wherein the first logical connection is an N32-f connection;

wherein the second logical connection is an N32-f connection;

wherein the first logical connection is protected by application layer security;

wherein the second logical connection is protected by application layer security; and wherein the first and second logical connections are for inter-network data exchange between a first network function of a first network and a second network function of a second network.

* * * * *